United States Patent [19]

White et al.

[11] 4,320,289
[45] Mar. 16, 1982

[54] PRECISION LASER PULSE RADIOMETER

[75] Inventors: Jack R. White, Camarillo; Charles L. Godwin; Raymond J. Blattel, both of Oxnard, all of Calif.

[73] Assignee: The United States of America as represented by the Secretary of the Navy, Washington, D.C.

[21] Appl. No.: 153,474

[22] Filed: May 27, 1980

[51] Int. Cl.³ .................................. H01J 40/14
[52] U.S. Cl. ........................ 250/214 R; 356/215
[58] Field of Search ............ 250/214 R, 214 B, 206; 356/215, 216, 218, 224, 229

[56] References Cited

U.S. PATENT DOCUMENTS 3,732,491 5/1973 Battista .................................. 356/215
3,999,061 12/1976 McLaughlin et al. ........... 250/214 R
4,174,177 11/1979 Gardner et al. .................. 250/214 B Primary Examiner—David C. Nelms
Attorney, Agent, or Firm—Robert F. Beers; Joseph M. St. Amand; William C. Daubenspeck

[57] ABSTRACT

Apparatus for automatically detecting and measuring the energy of laser pulses over a wide range of energy levels and in the presence of high ambient light levels. The current produced by a laser pulse striking a photoconductive detector is integrated by a capacitor to obtain a voltage across the capacitor which is proportional to the total energy incident on the detector during the pulse. The total energy of the pulse is then determined by measuring the time from when the capacitor voltage crosses a reference level during current integration to the time when the capacitor voltage, discharging through a resistor recrosses the reference voltage. The leading edge of the capacitor charging voltage is used to couple a high frequency oscillator to the input of a counter. The oscillator is then decoupled from the counter when the voltage of the discharging capacitor crosses a reference level. The count in the counter is transferred to a shift register for transmission to a data processing device. The effects of the ambient light are automatically compensated for with an interrupted feedback loop in which the loop is opened when a laser pulse is detected and the feedback held at the prepulse level for the duration of the RC discharge time.

11 Claims, 14 Drawing Figures

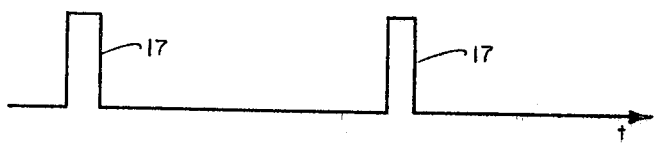
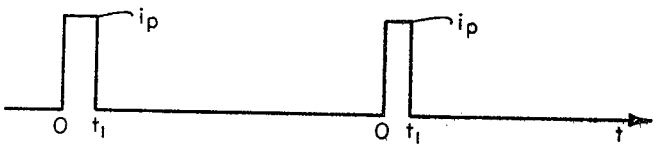
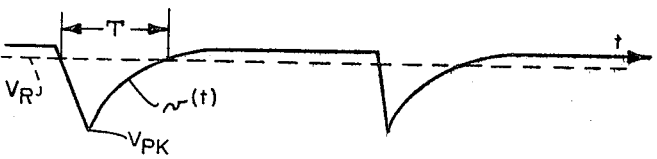
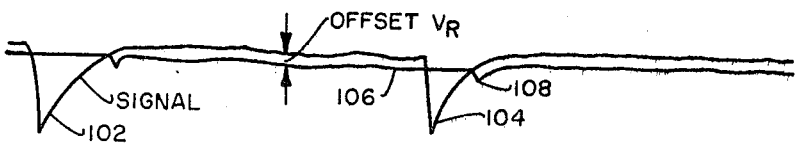
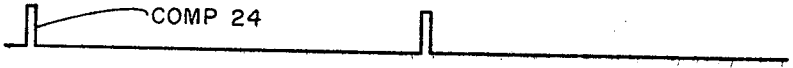
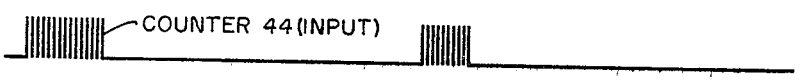
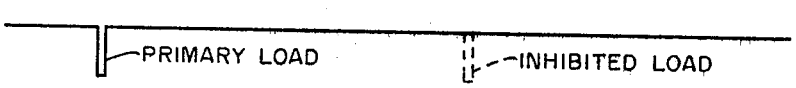
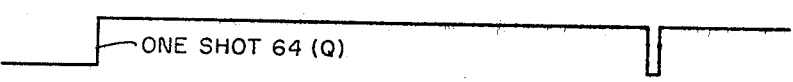
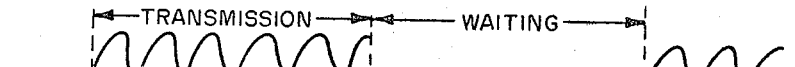
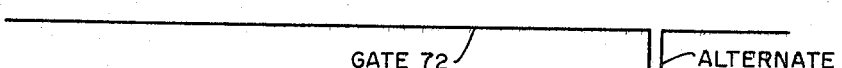

PRECISION LASER PULSE RADIOMETER

BACKGROUND OF THE INVENTION

This invention relates in general to measuring radiant energy from a pulsed laser or light source and, in particular, to an instrument for automatically measuring the energy of each pulse received over a wide range of energy levels in the presence of high ambient light levels.

An instrument for reliably detecting laser pulses and measuring the pulse power levels in daylight must overcome several problems which complicate the process. Pulses of laser light may be of very short duration; in many applications, a typical pulse width is 10 to 20 nanoseconds or less. Laser pulses may have a wide range of energy levels. In daylight, the laser pulses may be present in sunlight having a much higher energy level than the laser pulses themselves. This ambient light level may also be modulated by atmospheric scintillations. Thus a laser pulse radiometer may be required to isolate and measure laser pulses of widely varying energy levels under varying ambient light conditions when fluctuations caused by atmospheric scintillations are present.

Conventional laser radiometers measure the peak voltage or current that the laser pulse produces in a detector to determine the pulse power. Changes in the radiometer gain are usually required for these instruments to accommodate laser pulses having a wide range of energy levels. An operator action may be required to manually switch the instrument range which increases the possibility that laser pulses having an energy outside of the present range will not be detected, or if detected, not accurately measured. An instrument which would automatically change to the proper range upon detection would be very complex and expensive. An operator is also usually required to adjust compensation circuitry for the ambient light level.

It is also desirable that a laser pulse radiometer, in addition to automatically detecting and measuring the power level of a laser pulse, have the capacity of automatically transmitting the data to data processing device for further use or storage.

SUMMARY OF THE INVENTION

It is therefore an object of the present invention to provide an instrument for automatically detecting laser pulses and accurately measuring the energy level thereof.

Another object of the present invention is to provide an instrument which automatically detects and measures laser pulses having a wide range of energy levels without requiring manual or automatic scale changes.

A further object is to provide a laser pulse radiometer which distinguishes laser pulses from atmospheric fluctuations.

Another object is to provide a laser pulse radiometer which automatically compensates for the effects of the ambient light.

Still another object of the present invention is to provide a laser pulse radiometer which automatically transmits the data to remote data processing equipment.

Another object of the present invention is to provide the foregoing objects using simple, reliable, inexpensive, commercially available integrated circuits.

In a laser pulse radiometer according to the present invention a laser pulse striking a photoconductive detector produces a current in the detector directly proportional to the instantaneous radiant power of the incident pulse. This current is integrated in a capacitor to obtain a voltage across the capacitor which is proportional to the total radiant energy incident upon the detector during the pulse. The total energy of the pulse is then determined by measuring the time (pulse width) from when the capacitor voltage crosses a reference level during current integration to the time when capacitor voltage decay through a resistor recrosses the reference voltage. This time is nearly proportional to the logarithm of the received radiant energy. The measurement technique allows pulse energies to be measured over a wide range of energy levels without the need to switch the circuit gain. To accomplish the measurement of the pulse width, the leading edge of the capacitor charging voltage is used to couple a high frequency oscillator to the input of a counter. The oscillator input is then decoupled when the RC discharge curve crosses the reference voltage level and the count in the counter is transferred to a shift register for transmission to a data processing device. The effects of the ambient light are automatically compensated for with an interrupted feedback loop in which the loop is opened when a laser pulse is detected and the feedback held at the prepulse level for the duration of the RC discharge time.

Other objects and many of the attendant advantages will be readily appreciated as the subject invention becomes better understood by reference to the following detailed description, when considered in conjunction with the accompanying drawings wherein:

BRIEF DESCRIPTION OF THE DRAWINGS

FIGS. 2a–2c are waveforms illustrating the technique used to measure laser pulse energy in the present invention; and FIGS. 3a–3j are waveforms useful in understanding the operation of the preferred embodiment.

DESCRIPTION OF THE PREFERRED EMBODIMENT

Figure 1:
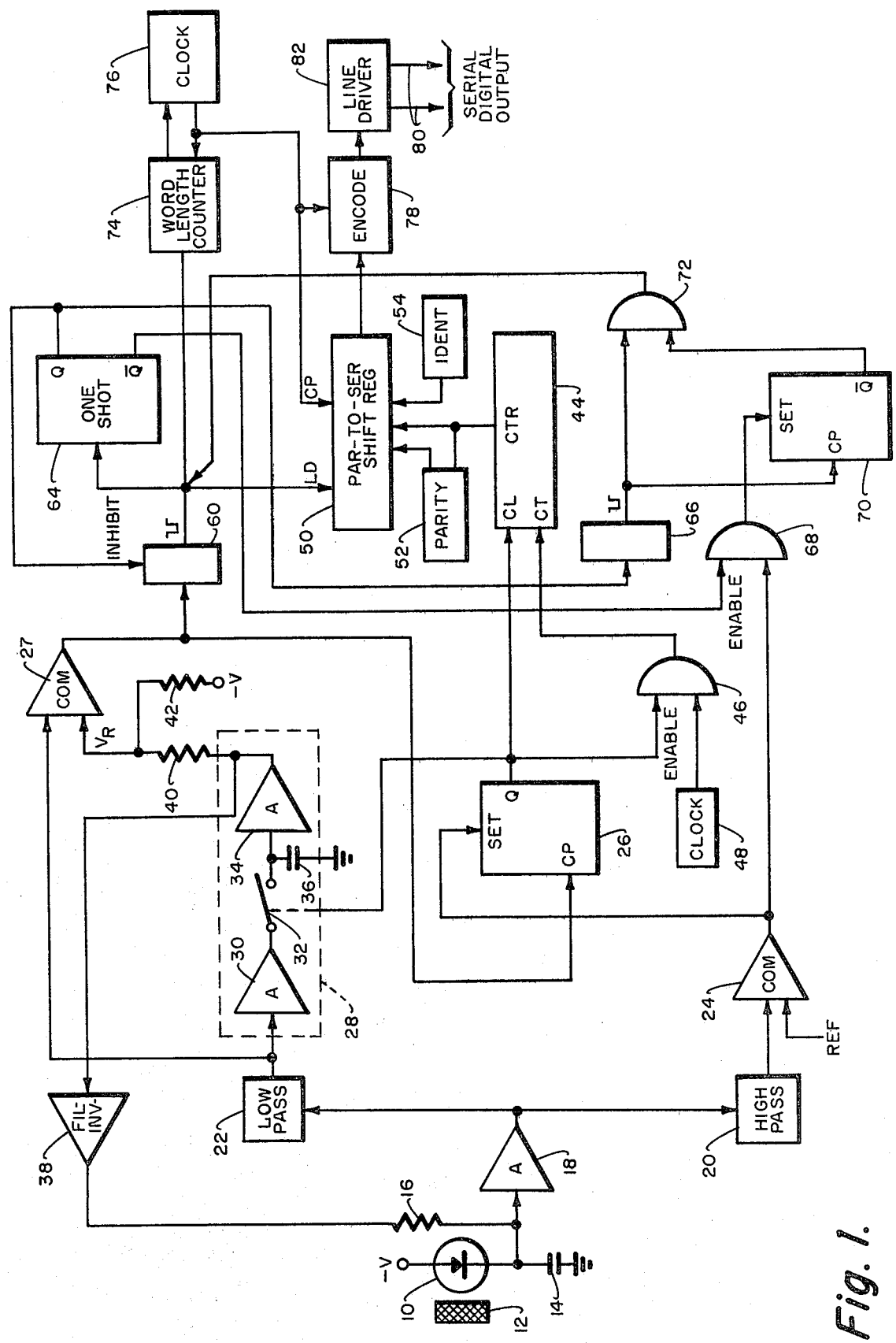
FIG. 1 is a schematic block diagram of the preferred embodiment of the present invention.

The preferred embodiment as described herein is adapted to measure the total pulse energy of laser pulses having a typical width in the 10–20 nanosecond range and to provide a dynamic range of $4 \times 10^5$. This embodiment is also adapted to transmit the data to a data processor having specific requirements. When quantitative values are given for specific components, these relate to the specific application and are only intended to be representative and to illustrate the operation of the preferred embodiment.

Referring now to the drawing, a laser pulse radiometer according to the present invention includes a photoconductive detector sensitive to wavelengths in the region of interest such as, photodiode 10 which is disposed to receive incident pulses of radiant power from a distant laser or other pulsed light source. A diffuser 12 is positioned in front of the photodiode 10 to distribute the incident light uniformly over the detector surface. The photodiode 10, which is reversed biased by negative supply voltage, $-V$, has its anode coupled to an integration capacitor 14 which has its positive side coupled to the circuit ground. The anode of the photodiode 10 and the negative side of the capacitor 14 are coupled to a resistor 16. The other side of the resistor 16 is coupled to a feedback network to compensate for the effects of the photocurrent produced by ambient light as will be explained hereinafter.

The current which flows through the photodiode 10 at any time from supply voltage, $-V$, is directly proportional to the instantaneous radiant power of the light which is incident on the diode's surface. As illustrated in FIGS. 2a and 2b, a pulse of laser light 17 striking the photodiode 10 produces a pulse of current, $i_p$, with a magnitude proportional to the radiant power which increases the charge stored in the integration capacitor 14. The voltage across capacitor 14 rises with charge, reaching a peak value, $$V_{PK} = 1/C \int_0^{t_1} i_p dt,$$

where C is the capacitance of capacitor 14 and $t_1$ is the duration of the pulse, at the termination of the laser pulse. The voltage across capacitor 14 at this instant is proportional to the total radiant energy incident on the detector 10 during the pulse (the power integrated over the duration of the pulse). After the termination of the laser pulse, the voltage across the capacitor begins to decay with an RC discharge curve, $$v(t) = V_{PK} e^{-t/RC},$$

where R is the resistance of resistor 16, as illustrated in FIG. 2c. The resistor 16 may be a variable resistor to allow adjustment of the RC time constant.

The present invention measures the width, T, of the discharge curve, v(t) between the crossing points of an arbitrary reference level $V_R$. This width T is given by $$T = RC \log_e \frac{V_{PK}}{V_R}$$

and this is proportional to the logarithm of the total pulse energy. It is noted that the charging curve ($V_R$ to $V_{PK}$) and the discharge curve (v(t)) are on vastly different time scales in FIG. 2c. The charging pulse width of $t=0$ to $t=t_1$ is typically $10 \times 10^{-9}$ seconds while the discharge pulse width T is typically $0.8 \times 10^{-3}$ seconds.

Referring again to FIG. 1, the voltage, v(t), across the capacitor 14 and the resistor 16 is amplified in a pair of inverting gain stages having gains of 13 and 100, respectively, represented by amplifier 18. Each stage of amplifier 18 is amplitude limited to prevent the amplifiers from saturating. This allows very high amplification but does not affect the measuring technique of the present invention since the information is contained in the width, T, of the discharge waveform v(t), not the height.

The output of the amplifier stage 18 branches to a high pass RC filter 20 and a low pass RC filter 22. Considering first the high pass branch, the output of the high pass filter 20 is fed to one input of a first comparator 24 which has as its other input a fixed reference voltage, this reference voltage being slightly above the system noise level. The high pass filter is coupled to the set input of a control flip flop 26. The high pass branch detects the leading edge of the waveform. Low frequency fluctuations, such as those caused at atmosphere scintillation are rejected by the high pass filter 20 so that only the high frequency components of the laser pulse are coupled to the first comparator 24. When a laser pulse occurs, the sharp leading edge is coupled through the high pass filter 20 to the first comparator 24. If the magnitude of the leading edge is greater than the reference voltage, the output of the first comparator changes from its normal state (i.e., when no laser pulse has been detected) to its triggered state, thereby setting the control flip flop 26. The term "normal state" as used herein refers to the state of an element under discussion when no laser pulse has been detected. The term "triggered state" as used herein refers to the state of an element in response to a laser pulse.

Considering now the low pass branch, the output of the low pass filter 22 is coupled to the first input of a second comparator 27 and to a track-or-hold circuit 28. The track-or-hold circuit 28 includes a first amplifier 30, a solid state switch 32, a second amplifier 34, and a holding capacitor 36. The solid state switch 32 is controlled by the Q output of the control flip flop 26, with the switch 32 being closed when no laser pulse has been detected. The output of the low pass filter 22 is coupled to the output of the first amplifier 30. One side of the solid state switch 32 is coupled to the output of the first amplifier 30 while the other side is coupled to the input of the second amplifier 34. The holding capacitor 36 is coupled between the input to the second amplifier 34 and circuit ground.

Under normal conditions, the track-or-hold circuit 28 will be in the track mode in which the switch 32 is closed and the circuit 28 functions as a noninverting amplifier with a gain slightly greater than one. When a laser pulse is detected by the high pass branch and thus the Q output of the control flip flop 26 is set, the solid state switch 32 will be opened, placing the circuit 28 in the hold mode. In the hold mold, the voltage on the holding capacitor 36 maintains the output of the second amplifier 34 at the level that existed immediately prior to the arrival of the laser pulse.

The output of the track-or-hold circuit 28 is coupled to two places. It is fed back through a very low pass filter inverter 38 to the resistor 16 to provide a current into the integration capacitor 14 that is equal in magnitude and opposite in direction to the photo current from the diode detector 10 caused by the ambient light. This feedback current cancels the effects of the ambient light from the measurement. The output of the track-or-hold circuit 28 is also fed through a network of resistors 40 and 42 to the second input of the second comparator 27 to become the reference voltage, $V_R$, for the comparator. The reference voltage tracks the signal voltage (applied to the other input of second comparator 27) with a constant offset of ninety-nine millivolts provided by supply voltage $-V$ through the resistors 42 and 40.

Returning now to the high pass branch which responds to the leading edge of the laser pulse, the Q output of the control flip flop 26, in addition to being coupled to the solid state switch 32, is coupled to the clear input of a ten-bit binary counter 44 and as an enable signal to one input of a two input AND gate 46 which has the output of a 2.5 megahertz clock 48 as its other input. The output of the AND gate 46 is coupled to the count up input of the binary counter 44. The setting of the control flip flop 26 by the leading edge of the laser pulse therefore clears the binary counter 44 and enables the AND gate 46 which couples the clock to the counter input. The counter 44 will thus begin counting at the rate of clock 48 when a laser pulse is detected. The width of the discharge curve will be measured by the number of cycles of the clock 48 counted by the counter 44.

The data outputs of the binary counter 44 are coupled to a 16-bit parallel-to-serial shift register 50. The data outputs of the counter are also coupled to a parity check generator 52 which provides a parity bit to the parallel-to-serial shift register 50. The shift register 50 may also receive a multiple-bit (5-bits in this case) identification code from an address setting means 54 to identify the source of the data if an address is required by the data processor.

Returning now to the low pass branch, the output of the second comparator 27 is coupled to the clock input of the control flip flop 26 (of the high pass branch) so that a transition of the second comparator 27 from the triggered state to the normal state (as occurs when the RC discharge curve crosses the reference voltage level $V_R$) will reset the control flip flop to its normal state. This in turn will disable gate 46 to remove the 2.5 megahertz signal from the binary counter 44. The output of the second comparator 27 is also coupled to a load pulse forming network 60 which produces a pulse output at the transition of the output of the second comparator 27 from the triggered state to the normal state. The output of the load pulse forming network 60 is coupled to the load input of the parallel-to-serial shift register 50 to load the data in the counter 44 into the shift register and to the input of a one shot multivibrator 64 to trigger the multivibrator.

The Q output of the one shot multivibrator 64 which has a 16 millisecond period is fed back to the load pulse forming network 60 where a high signal from the multivibrator inhibits the generation of the output load pulse. Thus, a second load pulse is inhibited for the period of the multivibrator 64. The Q output of the one shot 64 is also fed to a second pulse forming network 66 which forms a pulse at the end of the one shot period which is used to generate an alternate load pulse in the event a second laser pulse arrived while the serial digital word for the first pulse was still being clocked out of register 50. The $\overline{Q}$ output of the one shot 64 is fed to a gate 68 to enable the gate during the one shot period. The input to gate 68 is the output of the first high pass comparator 24 and the output of the gate 68 is coupled to the set input of a flip flop 70. This allows the leading edge of a laser pulse received during the period of one shot 64 to set the flip flop 70.

The $\overline{Q}$ output of the flip flop 70 is fed to one input of AND gate 72 which has as its other input the output of the second pulse forming network 66. The output of the second pulse forming network 66 is also coupled to the clock input of flip flop 70 is that the flip flop is reset at the end of the one shot period. The output of the AND gate 72 is coupled to the output of the load pulse forming network 60 so that a pulse on its output is distributed as a load pulse.

Considering now the transmission of the data from the shift register 50 to a data processor, the primary load pulse from network 60 or the alternate load pulse from gate 72 is coupled to a word length counter 74 which sets the counter 74 in preparation for counting output of the serial data from the shift register 50. The counter 74 then enables a 2-kilohertz clock 76 which applies clock pulses to the shift register 50 to clock the data out and to the word length counter which counts the clock pulses and then disables the 2-kilohertz clock 76 when all the data has been transmitted. The serial data bits are coupled from the shift register 50 to an encoder 78 means which formats the data for transmission to data processor (not shown) over a twisted pair output lines 80 via line drivers 82.

The sixteen millisecond period of the one shot allows 8 milliseconds for the 16 data bits to be clocked out of the shift register 50 by the 2-kilohertz clock 76 and a minimum of 8 milliseconds dead time for the data processor to read and store the data before a second set of data may be loaded into the shift register.

The operation of the laser pulse radiometer may be understood by reference to the waveforms of FIGS. 3a-3j. Curve 100 of FIG. 3a shows a representative waveshape of the signal from the amplifier 18 having a first laser pulse 102 and a second laser pulse 104 less than 16 milliseconds later. The signal is fed to the high pass filter 20 which removes low frequency fluctuations from the signal.

The leading edge of pulse 102 causes the first comparator 24 to change state as shown in FIG. 3b which in turn applies a signal to the set input of the control flip flop 26. The Q output of the control flip flop 26 as shown in FIG. 3c is fed to the binary counter 44 to clear the counter. The Q output also enables gate 46 which couples the 2.5 megahertz clock to the input of counter 44 as shown in FIG. 3d. Thus the counter begins counting at the 2.5 megahertz rate at the leading edge of the laser pulse.

The signal 100 (see FIG. 3a) from amplifier 18 is also fed via the low pass filter to the first input of the second comparator 27 and to the track-or-hold circuit 28. When no pulse is present (the track mode), the voltage applied to the first input of the second comparator 27 is represented by curve 100. With no pulse present, the track-or-hold circuit 28 provides voltage to the second input of comparator 27 that tracks the signal voltage but is offset by a small voltage, the reference voltage $V_R$ (99 mv in this case). This second input is shown by curve 106.

When the leading edge of the laser pulse 102 causes the Q output of the control flip flop 26 to be set, this Q output causes the track-or-hold circuit 28 to switch to the hold mode. In this mode, the holding capacitor 36 maintains the reference level that existed prior to the arrival of the laser pulse 102 as the feedback to the resistor 16 and as the offset reference level, $V_R$, to the second input to the comparator 27. When the input waveform initially crossed this reference, the comparator 27 changed states. As the waveform recrosses $V_R$, the second comparator 27 returns to its original state. This clocks the control flip flop 26 back to its reset state which returns the track-or-hold circuit 28 to the track mode, and stops the transmission of the 2.5 megahertz clock pulses from clock 48 to the 10-bit binary counter 44 (see FIG. 3d). The return of the track-or-hold circuit 28 to the track mode drives the reference input to the second comparator 27 to the offset from the signal as shown at 108 in FIG. 3a, effectively giving the second comparator positive feedback for more definite switching.

The transition of the second comparator 27 also generates the primary load pulse (see FIG. 3e) in network 60 to load the state of the (now stopped) binary counter 44 into the parallel-to-serial shift register 50. The parity bit for detecting transmission errors and the 5-bit identification number are also loaded.

The primary load pulse also initializes to the word length counter 74 which in turn enables the 2 kilohertz clock 76. The two-kilohertz clock shifts the 16-bits of data out of the shift register 50 (8 milliseconds are required at the two pulse per second rate to shift the 16-bits) and clocks the word length counter 74. The word length counter 74 disables the two-kilohertz clock 76 when the 16-bits have been shifted out of the register 50 as shown in FIG. 3h.

If a second laser pulse is received after the shift register 50 is loaded but before the data for the first pulse 102 has been clocked out and an 8 millisecond "dead time" for the operation of the data processing device (a total of 16 milliseconds) as is the case with pulse 104 in FIG. 3a, the preceding sequence of events will repeat up to the point of loading the second count into the shift register 50. To prevent the new data for the second pulse 104 from disrupting the data for the first pulse 102, the primary load pulse from network 60 also triggers the 16 millisecond one shot multivibrator 64 (see FIG. 3f). The Q output of the one shot is fed back to the pulse forming network 60 to inhibit the formation of a primary load pulse when the second comparator 27 switches as the discharge curve for the second pulse 104 crosses the reference level $V_R$ (see FIGS. 3a, 3c and 3e). The $\overline{Q}$ output of the one shot 64 is fed to gate 68 to enable the leading edge of pulse 104 to set flip flop 70 (see FIG. 3i).

At the end of the 16 millisecond one shot period, the Q output of the flip flop 70 and a pulse generated at network 66 combined in AND gate 72 to generate an alternate load pulse as shown in FIG. 3j which continues the operation according to the previously described sequence. To prevent an alternate load pulse from issuing if a second laser pulse 104 does not occur during the 16 millisecond period of the one shot 64, the pulse generated at network 66 by the termination of the one shot period is coupled to clear the flip flop 70. When a second pulse arrives after the termination of any particular one shot period, it will be measured in the same manner as of the first pulse 102.

Obviously, many modifications and variation of the present invention are possible in the light of the above teachings. It is therefore to be understood that within the scope of the appended claims the invention may be practiced otherwise than as specifically described.

What is claimed is:

1. Apparatus for detecting and measuring radiant energy from a pulsed laser in the presence of ambient light, which comprises:
   a. means responsive to pulses of radiant energy incident thereon for producing a current proportional to the instantaneous radiant energy of said incident pulses;
   b. means for integrating the current produced by said means responsive to said pulses to produce a voltage signal proportional to the total radiant energy of said incident pulse;
   c. means for discharging said voltage signal at a preselected time constant; and
   d. means for measuring the period of time that the voltage signal produced by said integrating means in response to the current produced by said pulse is greater than a reference voltage, the period of time being proportional to the logarithm of the total pulse energy.

2. Apparatus as recited in claim 1 further comprising: means for compensating for the current produced by the ambient light striking said means responsive to light so that the current integrated by said means for integrating is corrected for the effects of the ambient light.

3. Apparatus as recited in claim 1 wherein said means responsive to pulses of radiant energy includes a photodiode.

4. Apparatus as recited in claim 1 wherein said means for integrating includes a capacitor coupled to be charged by the current produced by the means responsive to pulses of radiant energy.

5. Apparatus as recited in claim 4 wherein said means for discharging said voltage signal includes a resistor coupled to said capacitor.

6. Apparatus as recited in claim 5 wherein said means for measuring includes:
   means coupled between said capacitor and said resistor and responsive to the leading edge of the voltage signal developed across said capacitor due to a pulse of light for beginning a count when said voltage signal across said capacitor increases to above a first reference level; and
   means coupled between said capacitor and said resistor and responsive to the discharging portion of said voltage signal developed across said capacitor to stop said count when said voltage signal decays to below a second reference level.

7. Apparatus as recited in claim 6 further comprising:
   means coupled between said capacitor and said resistor for providing a feedback current through said resistor and capacitor opposite in direction to the current from the photodiode due to the ambient light.

8. Apparatus as recited in claim 6 wherein said means responsive to the leading edge of the voltage signal includes:
   high pass filter means for coupling the high frequency components of the voltage signal to its output while filtering the low frequency components;
   first comparator means having a first input, a second input, and an output, the state of the output being determined by the input signal having the greatest magnitude, said first comparator having its first input coupled to the output of the high pass filter means and its second input coupled to a signal at said first voltage level;
   a control flip flop coupled to the output of said first comparator, the outputs of said control flip flop changing state when the voltage signal on the first input to said first comparator increases in magnitude from less than the first reference level to greater than the first reference level; and
   counter means coupled to an output of the control flip flop, said change of state of the control flip flop clearing said counter and coupling a oscillator signal to the input of said counter.

9. Apparatus as recited in claim 8 wherein said means responsive to the discharging portion of said voltage signal includes:
   a low pass filter means for coupling low frequency components of the voltage signal to its output while filtering the high frequency components;
   second comparator means having a first input, a second input, and an output, the state of the output being determined by the input signal having the greatest magnitude, said second comparator means having its first input coupled to the output of the low pass filter means, and having its second input coupled to said second reference level, the output of said second comparator being coupled to said control flip flop to change the state of said control flip flop when the voltage signal on the first input of the second comparator decreases in magnitude from greater than the second reference level to less than the second reference level, said change of state of said control flip flop decoupling said oscillator from said counter.

10. Apparatus as recited in claim 9 further comprising:

track-or-hold circuit means having its input coupled to the output of said low pass filter means and its output coupled to said resistor to provide a feedback current through said capacitor to compensate for the current produced by the ambient light, the output of said track-or-hold circuit means tracking its input if voltage signal from an incident pulse is not present on its input and, if a voltage signal from an incident pulse is present on its input, maintaining its output at the level that existed immediately prior to the arrival of the pulse.

11. Apparatus as recited in claim 10 wherein said track-or-hold circuit includes:

switch means having its input coupled to the output of said low pass filter means and its output coupled to said resistor; and a holding capacitor coupled between the output of said switch means and circuit ground, said switch means controlled by the output of said control flip flop so that said switch means is opened when the state of the control flip flop changes due to a pulse and is closed when the state of the control flip flop changes due to the decaying of the voltage signal through the second reference level.

* * * * *